April 16, 1957    F. A. E. PORSCHE ET AL    2,788,866
ADJUSTING MECHANISM FOR SERVO BRAKES, PARTICULARLY,
FOR MOTOR VEHICLES
Filed Nov. 5, 1954    2 Sheets-Sheet 2

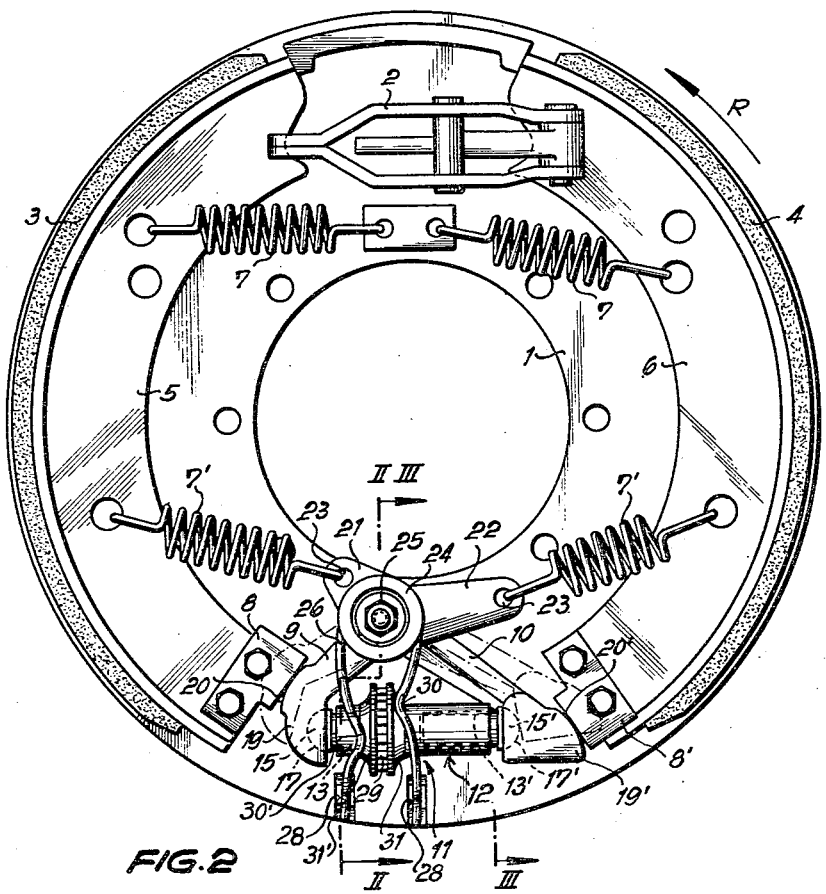

INVENTORS
Ferdinand A.E. Porsche
Egon Forstner
BY
ATTORNEYS

United States Patent Office 2,788,866
Patented Apr. 16, 1957

2,788,866

ADJUSTING MECHANISM FOR SERVO BRAKES, PARTICULARLY FOR MOTOR VEHICLES

Ferdinand A. E. Porsche, Stuttgart, and Egon Forstner, Stuttgart-Degerloch, Germany, assignors to Dr. Ing. h. c. F. Porsche K.-G., Stuttgart-Zuffenhausen, Germany Application November 5, 1954, Serial No. 467,182

Claims priority, application Germany November 28, 1953

9 Claims. (Cl. 188—79.5)

This invention relates to improvements in adjusting mechanisms for servo brakes with floating brake shoes, in particular for motor vehicles.

In known vehicle brakes of this general type, the brake shoes are supported directly on the adjusting screws, which are provided with inclined application surfaces. Where the brakes are provided with adjustment devices of this kind, however, the force exerted on the primary shoe of the brake is transmitted substantially entirely to the secondary shoe with the result that the braking becomes substantially uncontrollable. The braking is of this character because the variations in friction become very substantial on account of the servo action. As a result of these conditions, there is much greater and more rapid wear of the brake lining of the secondary shoe.

In order to avoid the disadvantages referred to, it has been proposed to transmit the force exerted on the primary shoe directly to the secondary shoe by means of levers arranged between the ends of the shoes. In order to attain a servo action, however, a movable thrust block had to be inserted between the levers. However, this type of arrangement not only makes the assembly of the adjustment device difficult but also makes the arrangement complicated and expensive.

The principal object of the present invention is, therefore, to provide a brake construction which will overcome the various difficulties and disadvantages referred to above.

A further object of the invention is to provide an improved brake construction including an adjusting device or arrangement which is less complicated than and less expensive than known brake constructions.

Another object of the invention is to provide a brake arrangement with a relatively simple shoe construction which requires no special constructional parts.

According to the invention, the foregoing disadvantages are overcome and the above objects are achieved by supporting the brake shoes indirectly from an adjustment mechanism forming a flexible abutment through two separate arms mounted in position to swing around a common axis. In this arrangement a simple shoe construction is attained without the need for special constructional parts for the flexible abutment. Furthermore, the construction is such that an easily assembled adjustment device forming a single unit can be used which acts simultaneously on both shoes.

According to a preferred construction, the two supporting arms between which the adjustment device is arranged have different lengths and are provided with convex application surfaces for engaging the brake shoes. In this way the members producing the equalization of force between the primary and secondary shoes are restricted to the minimum dimensions, and the shoes can easily be arranged to correspond to particular requirements by means of the convex surfaces carried by the arms. The arms are preferably carried side by side for swinging movement on a pin fixed to the brake backing plate and are bent over at their free ends toward the axis of the adjustment device, which is located intermediate the lower ends of the arms and brake shoes.

According to the invention, the adjusting device is supported freely between the arms by means of adjusting screws having semi-cylindrical or hemispherical heads seated in holes or seats provided in the arms, the heads being provided with flat parallel side surfaces fitting in the holes in the arms having corresponding side surfaces, respectively, and thereby securing the screws against rotation. The adjusting device includes an adjusting nut, threaded on the screws, having peripheral openings for receiving a tool to effect its rotation for forcing the arms apart, and includes application surfaces engaged by a centralizing spring adapted to straighten up the brake shoes following a braking operation.

According to a modified form of construction, the adjusting device may be made automatic so that automatic adjustment of the shoes is attained in dependence on the return movement path of the arms following a braking operation. According to the invention, this automatic adjusting device preferably comprises an adjusting nut provided with ratchet teeth, and a pawl guided in a slot and carried rotatably on the adjusting nut. The pawl in turn contains a spring-loaded ratchet tooth which is brought into engagement with the ratchet teeth of the adjusting nut so that a simple shoe adjusting arrangement is provided which is always ready to adjust the shoes whenever adjustment is necessary, and without any substantially greater expense.

The invention includes other features and advantages as described more in detail hereinafter in the accompanying drawings forming a part of this application and which show a constructional form and a modification.

In the drawings:

Fig. 1 is an elevational view of a brake mechanism of the type used for motor vehicles, with the brake drum removed;

Fig. 2 is a cross-sectional view taken on the line II—II of Fig. 1;

Fig. 3 is a view partly in section on the line III—III of Fig. 1, particularly showing one of the arms and a part of the adjusting device;

Figure 4:
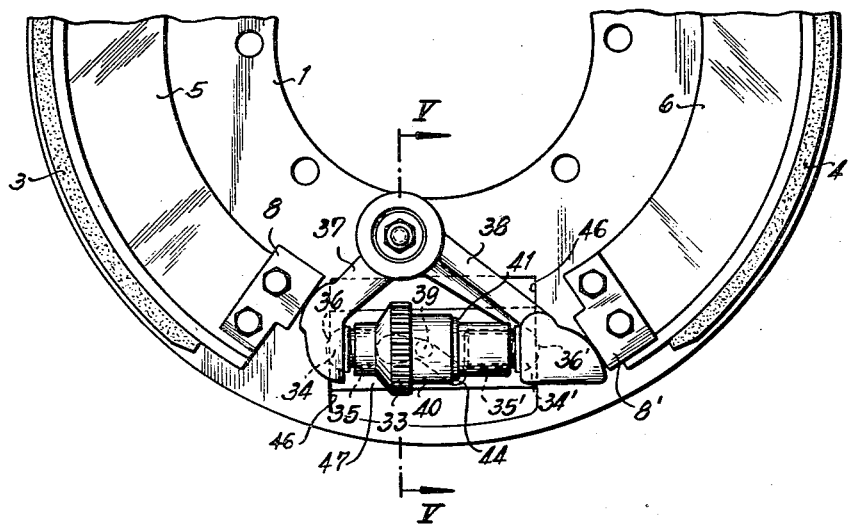
Fig. 4 is a broken elevational view similar to that of Fig. 1, of a modified form of construction from that of Fig. 1, particularly with respect to the adjusting means.

The brake shown in Figs. 1 to 3 comprises a carrier plate 1 to which is fixed an expanding device 2 by which brake shoes 5 and 6, provided with linings 3 and 4, are actuated against the action of return springs 7. The brake shoes are applied to a surrounding brake drum, which is not shown in the drawings. The brake shoes 5 and 6 are identical in construction and are provided at their lower ends with removable slide blocks 8 and 8', respectively, mounted in reversed positions, the shoes 5 and 6 being supported on an adjustment device 11 by means of arms 9 and 10. The adjustment device 11 includes an adjusting nut 12 threaded on adjusting screws 13 and 13', which have semi-spherical heads 15 and 15', respectively, each of which is provided with two parallel flat surfaces 16 and 16', as shown particularly in Fig. 3.

The arms 9 and 10 are respectively provided with holes or seats 17 and 17' corresponding to and respectively adapted to non-rotatively receive the heads 15 and 15', the arms being mounted so as to swing, separate from one another, on a pin 18 (Fig. 2) fixed to the brake carrier or backing plate 1. The arms 9 and 10 have free ends 19 and 19', respectively, which are thickened and bent over toward the axis of the adjusting device 11 in the manner shown in Fig. 3. The axis of the adjusting device may be substantially parallel to the backing plate 1 so that the free ends of the arms 9, 10 are bent over toward the axis and provided with seats or holes 17 and 17', respectively, for receiving the heads of the adjusting device. The arms 9 and 10 are respectively provided with convex bearing or application surfaces 20 and 20' with which the bearing surfaces of the slide blocks 8 and 8' of the shoes 5 and 6 are respectively in contact, according to the arrangement shown in Fig. 1.

The arm 9, as shown in Fig. 1, is shorter than the arm 10, and carries on its pivot hub, integral forked extensions 21 and 22, at its pivoted end or side opposite its free end 19, the extensions 21 and 22 having openings 23 for engagement by the lower shoe return springs 7'. The brake mechanism is completed by a shoe-centralizing spring 26 wound around the pin 18 and secured thereto by a disc or flanged member 24 and a nut 25. The spring 26 has curved end portions 27 which extend downwardly around the adjusting nut 11 and toward the plate 1, which slip into spaced slots 28 provided in the lower portion of the brake carrier plate 1.

During a braking operation, the force applied to the primary shoe 5 by the expanding device 2 presses this shoe against the brake drum then the servo action, corresponding to the direction of rotation, marked by the arrow R, pushes the slide block 8 of the shoe 5 against the application or bearing surface 20 of the arm or lever 9. The lengths of the arms or levers 9 and 10 are so selected and adjusted with respect to each other that the force transmitted from the primary shoe 5 to the secondary shoe 6, by way of the adjusting device 11, is approximately one-half the force developed in the primary shoe 5, thereby insuring uniform wear of the brake linings 3 and 4. The arm or lever 10, for example, has about twice the effective length of that of the arm or lever 9. In this connection it will be noted that the bearing surfaces of the blocks 8 and 8' are set radially inwardly and outwardly relative to each other. When the expanding device 2 is actuated the blocks 8 and 8' are pivoted or rocked slightly on the respective arcuate bearing surfaces 20 and 20'.

The adjustment of the brake shown in Figs. 1 to 3, when the linings of the shoes have worn, is affected by hand by means of suitable tools, for example a screw driver, by turning the adjusting nut 12, which for this purpose is provided with peripheral openings 29 distributed around its circumference and adapted to receive a screw driver, the screw driver being inserted, for example, through an opening 49 in the backing plate 1 directly in back of the circumferential openings 29, as shown in Fig. 2. Since the screws 13 and 13' are secured against rotation in the seats 17, 17', respectively, because of their surfaces 16 and 16', and since the screws are oppositely threaded, the rotation of the nut 12 spreads the arms 9 and 10 apart so that shoes 5 and 6 are moved up against the brake drum. The shoes are adjusted in this manner until a slight rubbing of the shoe linings on the drum is perceivable. After this adjustment, the adjusting nut 12 is turned back a little, for example, about one-quarter to one-half turn so that the vehicle wheel runs freely. The outward movement of the free ends of the arms 9 and 10 by the adjusting device 11, for instance into the respective positions shown by the dot and dash lines, does not affect the equalization of force between the primary and secondary shoes, since the turning relationship of the two arms on the pivot 18 does not alter.

In a braking operation, the arms 9 and 10, together with the adjusting device 11 swing or rotate on the pin 18 in a direction corresponding to the direction of rotation indicated by the arrow R in Fig. 1, thereby obtaining an intensifying action of the brake. When the braking operation ends, the shoes are moved back into their rest positions by the return springs 7' and are straightened up by the centralizing spring 26 acting through the arms 9 and 10, respectively. The centralizing spring 26 is provided with curved portions 30 and 30' directed toward and bearing against application surfaces 31 and 31', respectively of the adjusting device 11.

Figure 5:
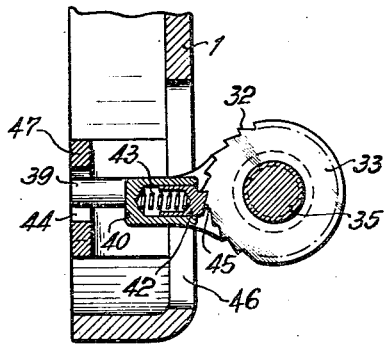
Fig. 5 is a vertical sectional view through the adjusting means taken on the line V—V of Fig. 4, on an enlarged scale.

Figs. 4 and 5 illustrate a brake mechanism of the type shown in Figs. 1 to 3, except that the brake shoes are provided with an automatic adjusting device in place of the hand-operated device 11. In Figs. 4 and 5, any reference characters which are the same as those in Figs. 1 to 3 refer to the same parts. In this modified construction the automatic adjusting device comprises an adjusting nut 33 provided with ratchet teeth 32 (Fig. 5) which, like the first constructional form of device, is threaded onto oppositely threaded adjusting screws 35 and 35' provided with semi-spherical heads 34 and 34', respectively. These heads, like the heads 15 and 15', are inserted in and fit in holes or seats 36 and 36', respectively of the arms 37 and 38, and thereby hold the adjusting device in position. A pawl 40, provided with a guiding pin 39, is rotatably carried on the adjusting nut 33 to one side of the ratchet teeth 32, and secured against axial displacement by a clamp ring 41. The pawl 40 has a ratchet tooth 42 which is pressed against the ratchet teeth 32 of the adjusting nut 33 by a spring 43.

In a braking operation, the arms 37 and 38, together with the adjusting device 33, including the pawl 40 attached to it, are swung to the right in the manner described above in connection with Figs. 1 to 3. During this operation and movement, the pawl is moved vertically downwardly by means of the pin 39 which extends through an opening 46 in plate 1 and is guided in an inclined slot 44 cut in a small bracket 47 fixed to the brake backing plate 1 across the opening 46, as shown in Figs. 4 and 5, the ratchet tooth 42 engaging in the next lower tooth 45 of the teeth 32 on the nut 33. After the braking operation is completed, the guiding pin 39, and with it the pawl, slides back to the left into its initial position, the pin 39 sliding upwardly along the slope of the slot 44, so that the adjusting nut is rotated and the arms 37 and 38 are forced apart. The ratchet mechanism comes into action only when the wear on the linings has proceeded to such an extent that the pawl in its movement can engage the next lower tooth and rotate the adjusting nut by one tooth, otherwise a braking operation does not act to operate the automatic mechanism to spread the arms 37 and 38.

It is to be understood that the brake shown in Figs. 4 and 5 is essentially the same as the brake shown in Figs. 1 to 3, except that in the former case, the brake-shoe adjusting device is automatic. It is furthermore to be understood that the brake in Figs. 4 and 5 may include the various springs and other details shown in Figs. 1 to 3. The important feature of the invention is that the brake-shoe adjusting means is arranged between the arms which equalize the braking force. The manner in which the adjusting device or the arms are formed in detail is of subordinate importance and may depend on the particular details of the brake construction and other conditions.

What we claim is:

1. In a servo brake for motor vehicles, including a brake carrier and backing plate and a pair of arcuate brake shoes mounted thereon opposite each other in position to engage a brake drum, means at one end of the brake shoes for actuating the brake shoes, means for supporting the brake shoes comprising a pin fixed to the brake backing and carrier plate inwardly of the other ends of the brake shoes, a pair of arms of unequal length, one end of each of which is pivoted on said pin, the arms extending from said pin between said other ends of the brake shoes and respectively having engagement surfaces contacting the respective other ends of the brake shoes, and a brake shoe-adjusting means mounted between the free ends of said arms and supporting said other ends of the brake shoes in spaced relation to each other.

2. A servo brake as claimed in claim 1, in which the adjusting means is supported solely by the arms, the free ends of the arms respectively each including a seat and the adjusting means including end portions respectively seated in said seats.

3. A servo brake as claimed in claim 2, in which the adjusting means includes a nut threaded onto a pair of adjusting screws, the free end of each screw being provided with a semi-spherical head fitting in the seat of one of said arms.

4. A servo brake as claimed in claim 3, in which the head of each adjusting screw is provided with two flat parallel side surfaces and its seat provided in the arm includes corresponding flat engaging surfaces adapted to prevent rotation of the screw.

5. In a servo brake for motor vehicles, including a brake backing plate and primary and secondary arcuate brake shoes arranged thereon with their lower ends in spaced facing relation, means for supporting the lower ends of the brake shoes in spaced relation with respect to each other so that when the shoes are actuated the primary shoe applies pressure to the secondary shoe, said supporting means including a pin projecting from the backing plate inwardly of the lower end portions of the brake shoes, two arms of unequal length pivoted on said pin and extending between the lower ends of the brake shoes with their free end portions spaced apart and respectively bearing against the lower ends of the brake shoes, and a brake shoe-adjusting means mounted between said arms and adapted to indirectly support the lower ends of said shoes in spaced relation.

6. A servo brake as claimed in claim 5, in which said brake shoe-adjusting means comprises a nut, and a centralizing spring acting on said nut to realign the brake shoes after a braking operation.

7. A servo brake as claimed in claim 5, in which the arm engaging the lower end of the primary shoe is substantially shorter than the arm engaging the secondary shoe, the effective lengths of the arms being so selected and adjusted with respect to each other that the force transmitted from the primary shoe through the adjusting means to the secondary shoe during a braking operation is approximately one-half the force developed in the primary shoe.

8. A servo brake as claimed in claim 5, in which the arm bearing against the primary shoe includes a bearing surface spaced substantially inwardly from its free end contacting the lower end portion of the primary shoe, and in which the adjusting means has end portions respectively engaging the free ends of the arms.

9. In a servo brake for motor vehicles, including a brake backing plate and primary and secondary arcuate brake shoes arranged thereon for engagement with a brake drum and with their lower ends in spaced facing relation, means for supporting the lower ends of the brake shoes in spaced relation with respect to each other so that when the shoes are actuated the primary shoe applies pressure to the secondary shoes, said supporting means including a fixed pivot pin carried by and projecting from the backing plate opposite the space between the lower ends of the brake shoes and inwardly thereof, a pair of separate arms pivoted on said pin having free end portions extending in angular relationship from said pivot pin into said space and respectively engaging said spaced facing ends of the brake shoes, and a brake shoe-adjusting means mounted between the free ends of said arms and adapted to support the lower ends of said shoes in spaced relation with each other, the distance from the pivot pin along the arm engaging the primary shoe to the point of its engagement being substantially less than the corresponding distance for the other arm and secondary shoe, whereby the force transmitted from the primary shoe through the adjusting means to the secondary shoe during a braking operation is substantially less than the force developed in the primary shoe.

References Cited in the file of this patent
UNITED STATES PATENTS

| | | |
|---|---|---|
| 1,678,427 | Flanigan | July 24, 1928 |
| 2,009,100 | Taylor | July 23, 1935 |
| 2,059,270 | Parker | Nov. 3, 1936 |
| 2,173,582 | Fisher | Sept. 19, 1939 |
| 2,277,335 | Loweke | Mar. 24, 1942 |
| 2,374,651 | Chowings | May 1, 1945 |

FOREIGN PATENTS

| | | |
|---|---|---|
| 826,153 | France | Dec. 27, 1937 |